United States Patent [19]

Sudama et al.

[11] Patent Number: 5,483,652
[45] Date of Patent: Jan. 9, 1996

[54] MECHANISM FOR LOCATING WITHOUT SEARCH DISCRETE APPLICATION RESOURCES KNOWN BY COMMON NAME ONLY IN A DISTRIBUTED NETWORK COMPUTING ENVIRONMENT

[75] Inventors: Ram Sudama, Concord; David L. Magid, Worcester; Kenneth W. Ouellette, Groton, all of Mass.

[73] Assignee: Digital Equipment Corporation, Maynard, Mass.

[21] Appl. No.: 185,617

[22] Filed: Jan. 24, 1994

[51] Int. Cl.$^6$ ............................................. G06F 17/30
[52] U.S. Cl. ............................ 395/600; 364/DIG. 1
[58] Field of Search ............................................. 395/600

[56] References Cited

U.S. PATENT DOCUMENTS

| | | | |
|---|---|---|---|
| 4,644,470 | 2/1987 | Feigenbaun et al. | 395/200.02 |
| 5,313,646 | 5/1994 | Hendricks et al. | 395/600 |
| 5,377,323 | 12/1994 | Vasudevan | 395/200.16 |

OTHER PUBLICATIONS

Sato, "Network Directory Concept for an Intelligent Network", Globecom '89, IEEE Global Telecommunications Conference, 27–30 Nov. 1989.
Hodson, "The Global Directory–An Overview," IEE Colloquium on 'The Global Directory' (Digest No. 67), 19–Apr. 1990, pp. 11–15.
Kille, "Implementing The Directory", IEE Colloquium on 'The Global Directory' (Digest No. 67), 19 Apr. 1990, pp. 5/1–5/4.
Rosenberry et al, Understanding DCE, O'Reilly & Associates, 1992, pp. 1–238.
Hartman, "Unclogging Distributed Computing", IEEE Spectrum, May 1992, pp. 36–39.
Orr et al, "Strange Bedfellows: Issues in Object Naming Under Unix", Object Orientation in Operating Systems 1993 International Conference, 9–10 Dec. 1993, pp. 141–145.

*Primary Examiner*—Thomas G. Black
*Assistant Examiner*—Wayne Amsbury
*Attorney, Agent, or Firm*—Kenneth F. Kozik

[57] ABSTRACT

Method and apparatus facilitating the processing of a request from a client application for a service, or for access to a resource, in a distributed computing environment. A shared repository is organized in such a manner that binding information, defining how a server is accessed, can be stored in the repository and accessed by multiple clients without their having knowledge of more than the common name for the requested service, or the common name of a specific resource for performing the service. The binding information for each server is stored in a server entry sub-hierarchy of the namespace in the shared repository, and the full names of server entries are stored in a service entry sub-hierarchy of the namespace and a resource entry sub-hierarchy of the namespace. When a client requests access to a service or to a specific resource, the server entry names are accessible from the service entry sub-hierarchy of the namespace or the resource entry sub-hierarchy of the namespace, using only common names for the service or resource. Once a server entry name is obtained, the binding information is retrieved for the client, and a logical connection can be established between the client and the requested service or resource, without having to provide each client with detailed information about the location or name of the server binding information.

16 Claims, 6 Drawing Sheets

MECHANISM FOR LOCATING WITHOUT SEARCH DISCRETE APPLICATION RESOURCES KNOWN BY COMMON NAME ONLY IN A DISTRIBUTED NETWORK COMPUTING ENVIRONMENT

BACKGROUND OF THE INVENTION

This invention relates generally to techniques that facilitate sharing of resources in computer networks. More particularly, the invention relates to a distributed computing environment in which multiple computer resources are physically distributed and are interconnected through a network, or multiple networks. Further, the resources are accessed by multiple application "clients," which are also, in general, distributed through the network.

Computer networks continue to grow in both size and complexity. The principal reason for connecting computers to networks, and connecting networks to other networks, is to enable computers to work together efficiently, and to simplify sharing of resources. Shared resources include files, applications (in the form of computer software), printers, and special computers.

Examples of distributed applications include an electronic conferencing service, a distributed printing service, and a distributed calendar management service. Each of these applications maintains a set of resources. In a typical distributed computing environment, entities known as "servers" manage access to the shared resources, and entities known as "clients" seek access to the resources. For example, the resources of an electronic conferencing service are the individual conferences, or "bulletin boards," that users access. The resources of a distributed printing service are the actual printers. The resources of a distributed calendar management service are the individual calendar databases.

Users of applications frequently seek access to specific resources rather than to application resources at large. For example, a user of an application that prints will typically seek access to a specific printer rather than to any printer. Similarly, a user will commonly want to access a specific conference in a distributed conferencing application, and to a specific database in a distributed calendar management application. In large networks, there can be a potentially large number of application servers for each service, and a correspondingly even larger number of application resources distributed among these servers. Therefore, client applications require a consistent means for locating application resources on behalf of users. Unfortunately, there has been no consistency or uniformity in the naming and location of application servers and resources.

In the past, the location of a distributed application resource had to be fully specified by the user each time the resource was accessed. For example, a user seeking network access to a remote file would have to specify a host system name or address where the file was located, and a complete "path" between the user and the file server managing access to the file. Some distributed applications have tried to improve on this approach by providing location information that is specific to a particular application. For example, a user need then only specify an application-specific "alias" to refer to a remote file. The alias name would be translated by the application client system into the required file name and location information, relieving the user of the burden of having to remember all the specifics of addressing required to access each resource. However, the use of aliases is difficult to manage because every time a new resource is created, or the location of an existing resource is changed, this information has to be communicated in some way to every client system, for updating translation tables.

Distributed name services have been developed to help with the problem of accessing remote services. These services provide network-wide access to a common database, in which location information can be stored, and shared by all clients. Unfortunately, these directory services simply provide a repository for information, and do not prescribe how applications should use the repository. Each application devises its own mechanism for utilizing the "namespace" that defines the names and locations of servers and resources in such a way that clients can locate them as needed. Creating these mechanisms complicates the design and implementation of distributed applications, and also complicates the management of the distributed environment, since there may be a large number of different, and potentially conflicting, uses of the distributed namespace.

Many of the difficulties of distributed computing, including the difficulty of locating shared resources, have been addressed by a software system known as Distributed Computing Environment (DCE), promulgated by the Open Software Foundation (OSF). The scope, objectives, and function of DCE are concisely explained in a book entitled "Understanding DCE," by Ward Rosenberry et al., published in 1992 by O'Reilly & Associates, Sebastopol, Calif. 95472.

DCE provides a distributed directory service consisting of a shared repository having an associated hierarchical namespace. The DCE standard provides a minimal structure to the namespace for the purpose of distinguishing the addresses of, and management information associated with, multiple hosts in the network. It also provides primitive operations for creating and managing individual elements in the namespace, such as directories, server entries and several types of group entries. However, it does not provide any additional structure that would aid in the common management of application services, servers or resources.

In short, although DCE provides a hierarchical structure for naming and locating "objects" that contain information about servers, it provides no guidance as to how the structure might be used to avoid potential conflict between names, or to simplify resource sharing from a user standpoint. The present invention is directed to these ends.

SUMMARY OF THE INVENTION

The present invention resides in a method and related apparatus, for use in a distributed computing environment, for transferring information between a server entity and a client entity in such a manner as to avoid conflicts and to permit the client entity to request access to a service or resource without knowledge of any more than a common name for the service or resource. For example, a common name for a printing service might be "print" and a common name for a particular printing resource might be "printer_1."

In general terms, the invention may considered to be a method for structuring a hierarchical namespace accessible from multiple host systems in a distributed computing environment. The method comprises the steps of defining a host sub-hierarchy containing for each host, and each service provided by the host, a list of storage locations to be used by server applications for storing information pertaining to respective servers performing the service; and defining a service sub-hierarchy containing for each service available in the distributed computing environment a list of the same storage locations defined in the host sub-hierarchy. With this structure, a client application can access the service sub-hierarchy using a common name of a desired service, and can thereby obtain information from a server application without knowledge of more than the common name of the service.

The method preferably also comprises the steps of defining a resource sub-hierarchy containing for each service available in the distributed computing environment a list of resources available through each service; and defining for each resource a list of the same storage locations defined in the host sub-hierarchy. A client application can then access the resource sub-hierarchy using a common name of a desired resource, and can thereby obtain information from a server application without knowledge of more than the common name of the resource.

In more specific terms the method comprises the steps of exporting information from a server to a server entry in a shared repository, the server entry being accessed by a "full name," i.e. a name that completely identifies the server by host name and server name; and storing in a service entry of the shared repository the full name of the server entry used in the exporting step. The service entry is accessed by a name that includes a common name for the service provided by the server, and the service entry itself contains the full name of the server entry. The method further includes the step of importing the exported information into a client entity, using only the common name of the service. The importing step includes retrieving the service entry to obtain the full name of the server entry, then retrieving the server entry before importing the information.

Even more specifically, the importing step also includes generating the full name of the service entry from the common name of the service, prior to retrieving the service entry to obtain the full name of the server entry.

The same principles are used to handle a request from a client for a specific resource, rather than for a service in general. In this case, the method includes storing in at least one resource entry of the shared repository the full name of the server entry used in the exporting step. Each resource entry is accessed by a name that includes a common name for the resource accessed by the server, and each resource entry contains the full names of all server entities through which the resource can be accessed. The importing step requires only the common name of the resource, and includes retrieving the resource entry to obtain the full names of all server entries associated with the resource, then selecting one of the server entries and retrieving the server entry before importing the information.

The method of the invention may also be defined as utilizing a shared hierarchical storage structure to facilitate passing of information from a server entity to a client entity in a distributed computing environment. The method comprises the steps of defining the shared storage structure to include a server entry sub-hierarchy of the namespace accessible by host name and server name, a service entry sub-hierarchy of the namespace accessible by service common name, and a resource entry sub-hierarchy of the namespace accessible by service common name and resource common name. The method further includes, for each server entity, storing binding information in the server entry sub-hierarchy of the namespace, to define how to access the server entity; for each service, storing in the service entry sub-hierarchy of the namespace a full name for each server providing the service; and for each resource, storing in the resource entry sub-hierarchy of the namespace a full name for each server providing access to the resource. Then the method performs the steps of requesting, in a client entity, access to a desired service or resource, using only a common name; retrieving an appropriate server entry name from the service entry sub-hierarchy of the namespace, if access to a service has been requested; retrieving an appropriate server entry name from the resource entry sub-hierarchy of the namespace, if access to a particular resource has been requested; and using the retrieved server entry name to retrieve binding information from the server entry sub-hierarchy of the namespace.

More specifically, each of the steps of retrieving an appropriate server entry name includes generating a full name from the common name supplied in the requesting step; using the full name to retrieve at least one server entry name to fulfill the request; and selecting from the retrieved server entry names one that will be used to satisfy the request.

The invention may also be defined in terms of apparatus of approximately equivalent scope to the methods described above. For example, the invention may be defined as apparatus utilizing a shared hierarchical storage structure to facilitate passing of information from a server entity to a client entity in a distributed computing environment. The apparatus comprises a shared storage structure, including means for defining the shared storage structure to include a server entry sub-hierarchy of the namespace accessible by host name and server name, a service entry sub-hierarchy of the namespace accessible by service common name, and a resource entry sub-hierarchy of the namespace accessible by service common name and resource common name. The apparatus further includes means for storing binding information, for each server entity, in the server entry sub-hierarchy of the namespace, to define how to access each server entity; means for storing in the service entry sub-hierarchy of the namespace, for each service, a full name for each server providing the service; and means for storing in the resource entry sub-hierarchy of the namespace, for each resource, a full name for each server providing access to the resource. The apparatus further includes means for requesting, in a client entity, access to a desired service or resource, using only a common name; means for retrieving an appropriate server entry name from the service entry sub-hierarchy of the namespace, if access to a service has been requested; means for retrieving an appropriate server entry name from the resource entry sub-hierarchy of the namespace, if access to a particular resource has been requested; and means for using the retrieved server entry name to retrieve binding information from the server entry sub-hierarchy of the namespace.

It will be appreciated from the foregoing that the present invention represents a significant advance in techniques for sharing resources in a distributed computing environment. In particular, a procedure is prescribed for servers to export binding information in such a way that there will be no naming conflicts in the use of shared space, and binding information may be conveniently retrieved and imported by multiple clients with knowledge of only the common names of the requested services and resources. Other aspects and advantages of the invention will become apparent from the following more detailed description, considered together with the drawings.

DESCRIPTION OF THE PREFERRED EMBODIMENT

As shown in the drawings for purposes of illustration, the present invention is concerned with a technique for facilitating sharing of resources in a distributed computing environment. Prior to this invention, available distributed directory services have permitted complete flexibility in naming and locating server information that defines how to access computer resources. It would be helpful to have a basic understanding of a software system known as Distributed Computing Environment (DCE), promulgated by the Open Software Foundation (OSF), before turning to a detailed description of the present invention. DCE was developed in an effort to improve a number of problematic aspects of distributed computing, one of which is the difficulty of locating resources in the distributed environment.

The following are definitions of some of the terms used in this specification:

A host is a computing system, such as a mainframe computer or a desktop personal computer.

A network is a set of hosts, interconnected by some physical and logical communications infrastructure.

A user is a human user of the network environment.

An interface is a collection of well-defined procedures and/or functions that can be invoked remotely.

A service is a unique collection of well-defined interfaces.

A service interface is an interface in the service not used in any other service.

An application is an implementation of a service. Each application is composed of a client component and a server component.

A client or client application is the component of an application that invokes procedures and functions of a service. Sometimes the term client may be used to refer to the system or host on which the client application is executed, or to a human user of the client application.

A server or server application is the component of an application that implements and executes the procedures and functions of a service in response to client requests. The term server by itself may also be used to refer to the system or host on which the server application is executed.

A server instance refers to an individual copy of a server executing on a host.

A resource is an application-specific entity that is the object of functions performed by a server. For example, a printer is the resource of a printing service. A file is the resource of a file service.

A service is a replicated service if more than one server of the service runs on the network.

A replicated resource is one that is the object of more than one server.

A UUID is a universally unique machine-readable identifier.

An interface ID is a UUID for an interface.

A service ID is a UUID for a service interface.

A server ID is a UUID for a server instance.

A resource ID is a UUID for a resource.

An object attribute is part of a namespace entry. It contains an ID which can be a service, server or resource ID.

Binding information contains locations of servers. It also contains the interfaces that a server supports.

A server attribute is part of a namespace entry that contains binding information.

Locations of servers in binding information may be incomplete. Part of the location is the location of a server on a host. DCE provides an extension to the global namespace on each host, known as the endpoint mapper, which provides the locations of servers keyed by interface and optional UUID.

A binding is a machine-readable entity which contains server location information and, optionally, a UUID. The UUID on a binding is available to a server when a client uses it to make a remote procedure call. If the binding location information in the namespace from which the a binding was created was not complete, the binding's server location will not be complete either. A binding's location information can be completed by accessing the endpoint mapper on a particular host.

Given these component definitions, which should be further clarified from examples to be discussed, one can construct a distributed environment using a basic client-server relationship. However, a client application wishing to access a selected resource managed by a server application must have specific knowledge of the name and location of the server application. Since there may be a large number of server applications associated with a particular service, and an even larger number of application resources distributed among the server applications, locating an appropriate server application by name and location is often extremely difficult. The difficulty has been reduced, to some degree, by the provision of directory services, such as the cell directory service (CDS) and global directory service (GDS) provided by DCE. Directory services of this type have a shared repository with a hierarchical namespace, that is to say there is a standardized way of naming directories that make up the shared repository. The term shared repository means a structure that is accessible from any host in the network. The shared repository is logically a single storage entity, although in practice it may be located in more than one physical location. Entries (i.e. information) may be stored in the shared repository by one host and retrieved by another. In the context of the client-server relationship, a server application stores binding information in the shared repository provided by CDS, and a client application may retrieve the binding information, for use in calling the server to access a resource. A server application storing binding information in the repository is said to be exporting binding information, and a client application retrieving binding information is said to be importing binding information.

Although directory services, such as the CDS of DCE, provide a basic mechanism for establishing connection between a client application and a server application, they provide no guidance at all as to how the mechanism should be used. Even though the CDS namespace is a hierarchical structure, someone designing a server application may choose any name at all for the server, and place it in any desired level or location in the structure. A client application wishing to locate a specific service, such as a print service, must have knowledge of how the namespace hierarchical structure has been used by the server applications. The design philosophy of the CDS hierarchical structure provides complete flexibility of design to servers and clients alike. The goal was apparently to allow designers of server and client applications to devise a naming and resource-locating scheme that best meets their needs. Unfortunately, this approach is of little help in extremely large network configurations, where literally hundreds of servers and clients may be seeking to establish communication, and not all of them are within the control of a single designer or network administrator. Clearly, a simpler approach is needed to permit clients to locate appropriate resources and effect a logical connection between a client application and an appropriate server application.

The present invention specifies the information a server exports to the namespace and how a client establishes a connection to the server using this binding information. In accordance with an important aspect of the invention, a directory service namespace (such as the CDS namespace) is configured in such a manner that a service can be more easily selected by a client application, using only a common name for the service, such as "print" for a printing service, and a particular service resource can also be selected by a client application using only a common name for the resource, such as "printer_1." To achieve this goal, servers must follow a prescribed procedure to place binding information in the hierarchical structure of the shared repository provided by the directory service. From the common name provided by the client application when making a request to a server application, the client application automatically generates an unambiguous or "fully qualified" name that allows access to the stored binding information, which can then be imported by the client application.

Figure 1:
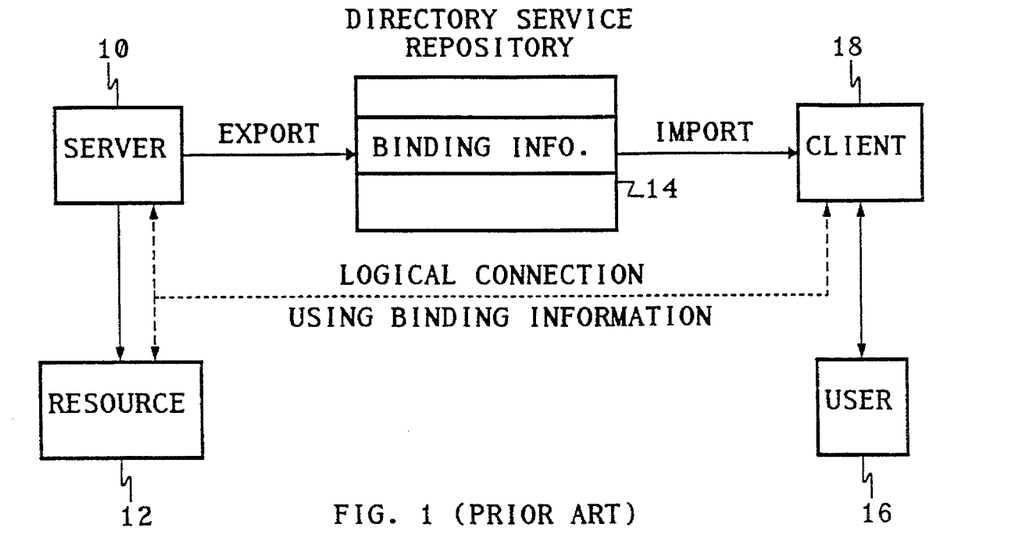
FIG. 1 is a block diagram showing the relationship between a client and a server.

FIG. 1 shows diagrammatically how a client-server connection is established using a directory service, such as the Cell Directory Service (CDS) of the Distributed Computing Environment (DCE). A server application, indicated at 10, provides access to a resource 12, such as a printer. The server application is required to export binding information to a shared repository 14 managed by a directory service, such as CDS. When a user 16, through a client application 18, wishes to access the resource 12, the client application must import the binding information from the shared repository 14. Based on the imported binding information, the client application 18 establishes a logical connection with the server application 10.

Figure 2A:
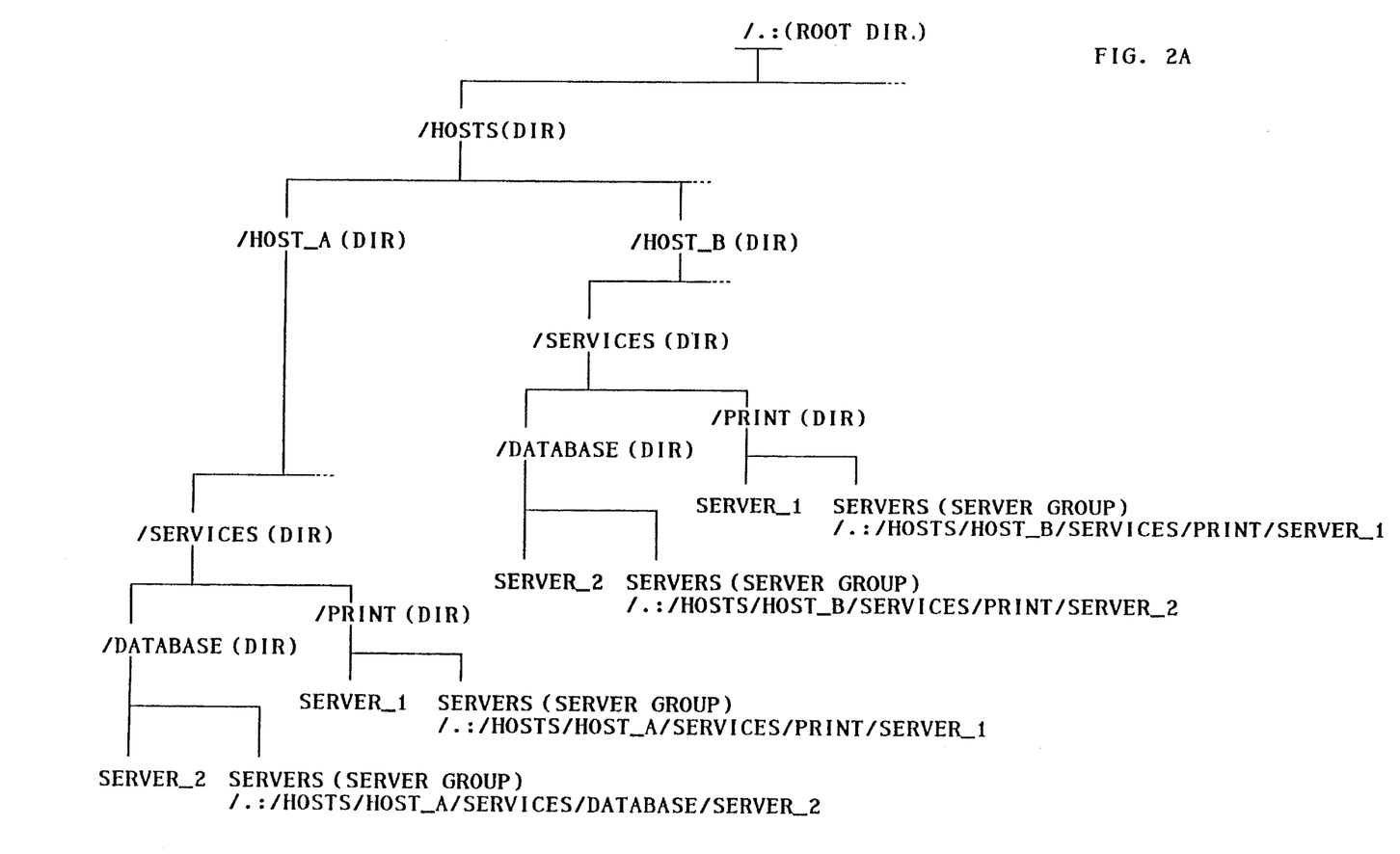
FIGS. 2A, 2B and 2C together comprise a diagram showing an example of a hierarchical namespace used in accordance with the invention.
Figure 2B:
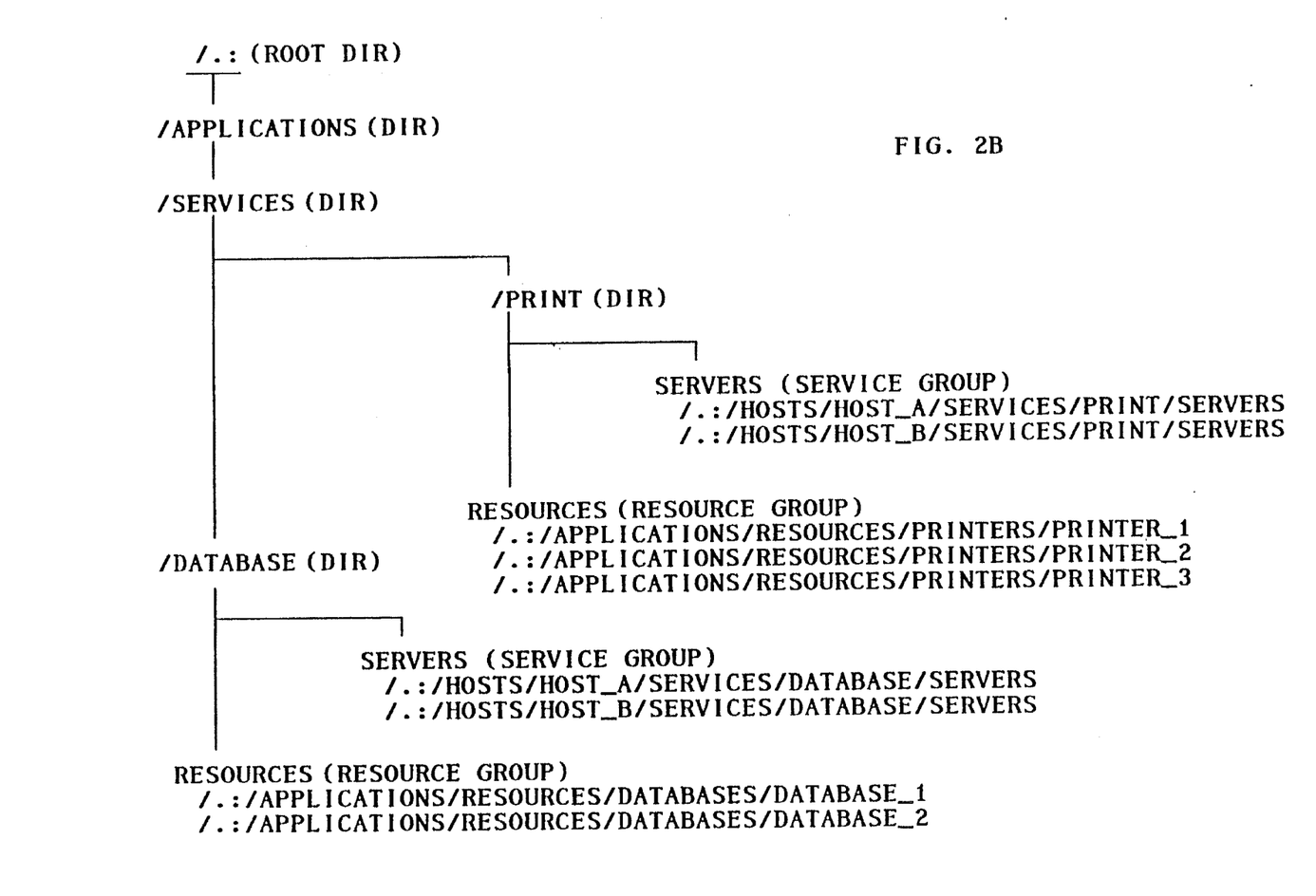
Figure 2C:
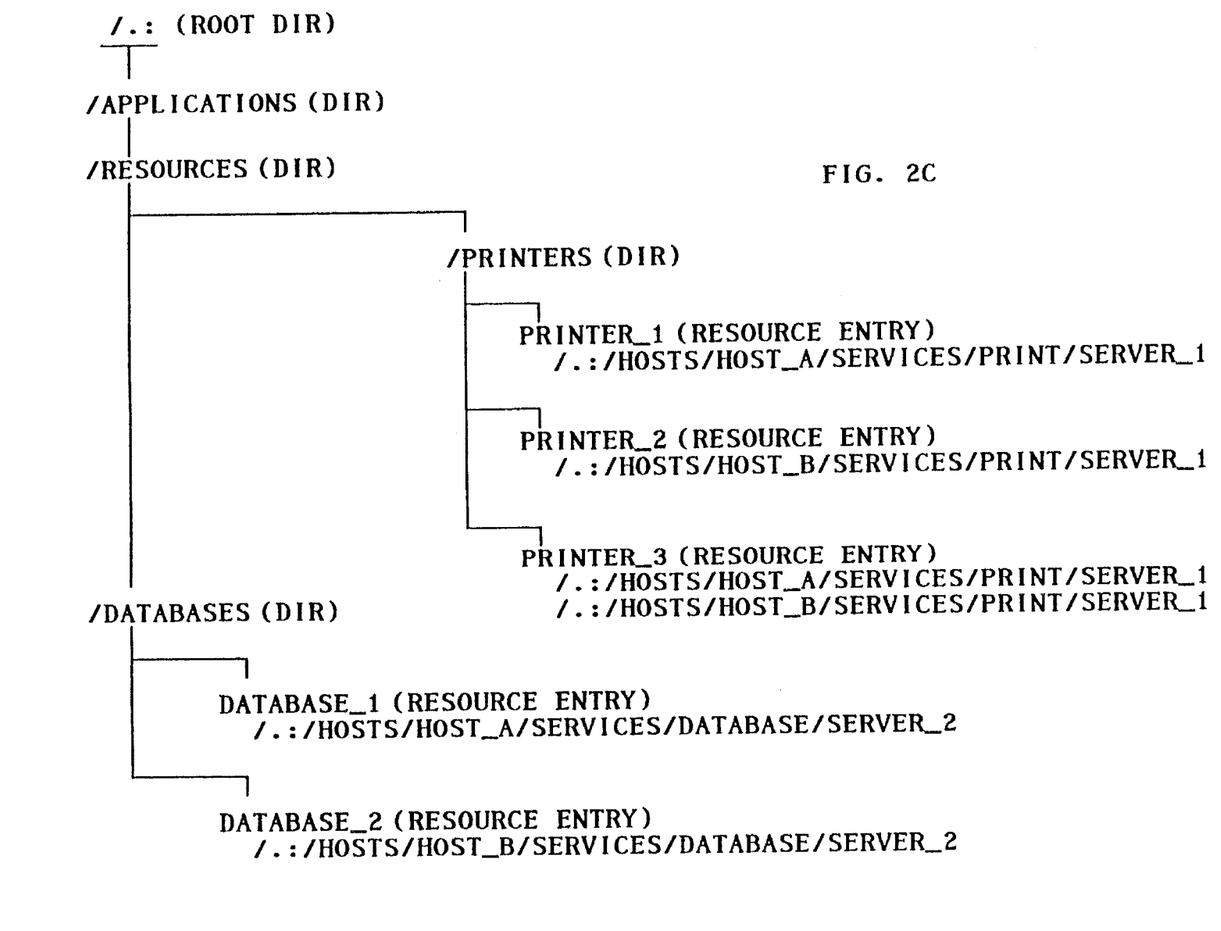

In a practical configuration, there will typically be many servers that provide access to many resources, and, of course, there will be many clients seeking access to the resources. The various clients and servers will, in general, be derived from multiple manufacturers and will not necessarily be under the control of a single network administrator. Yet all of the clients and servers have to import and export binding information through the shared repository. As shown in FIGS. 2A, 2B and 2C, DCE provides a convenient hierarchical structure for the repository, consisting of a "root directory" and a number of "child directories" that depend from the root directory. Each directory, whether the root directory or a child directory, may contain entries, which are referred to as "objects" in DCE terminology, and may contain definitions of lower levels of child directories. Some entries in this shared repository are defined by the DCE standard. For example, under the root directory, which is referred to by the nomenclature /.:, there is a child directory with the name /HOSTS. The /HOSTS directory of the hierarchical structure as used in the present invention is depicted by way of example in FIG. 2A.

Under the /HOSTS directory there is another child directory for each host in the network. For example, there may be directories with the names /HOST_A and HOST_B, as shown in FIG. 2A. Each host directory may contain information about the host itself, and may be used to store information about server applications executing on the host. The full names of the host directories illustrated are:

/.:/HOSTS/HOST_A and

/.:/HOSTS/HOST_B.

It will be observed that the hierarchical namespace provided by the directory service is similar to the file organization in a computer operating system. However, in the context of sharing information about available services the DCE standard provides no guidance as to how the namespace should be used. The designer or supplier of a server application may choose to export binding information to virtually any named location in the shared repository. Therefore, a client application seeking access to the server application must somehow first learn where the binding information for that server application is stored. The present invention greatly simplifies this process by providing a logical structure for registering services and resources, such that the binding information relating to the services and resources is exported to predictably named locations in the shared repository of the directory service. Then the user need supply only a common name of a service or a resource, and the client application can generate a complete location in the namespace, from which to import the binding data and thereby establish a connection to the service or resource. As will be discussed, the mechanism of the invention is also capable of handling replicated servers, each of which is capable of performing the same service function, and replicated resources, each of which can be accessed through more than one server application.

FIGS. 2A–2C provide an example depicting how the namespace associated with a shared repository of a directory service is organized in accordance with the invention. As mentioned above, the cell directory service (CDS) of DCE has a root directory /.:, a hosts directory /.:/HOSTS, and individual host directories, for example /.:/HOSTS/ HOST_A and /.:/HOSTS/HOST_B. In accordance with one aspect of the invention, each of the individual host directories is defined to have a child directory named /SERVICES. Thus there are directories named /.:/HOSTS/ HOST_A/SERVICES and /.:/HOSTS/HOST_B/SERVICES. Each of the these SERVICES directories contains another level of child directory for each service associated with the corresponding host. For example, the directory /.:/HOSTS/HOST_A/SERVICES may have child directories /.:/HOSTS/HOST_A/SERVICES/PRINT (for a print service) and /.:/HOSTS/HOST_A/SERVICES/DATABASE (for a database service). Similarly, the directory /.:/HOSTS/ HOST_B/SERVICES may have two similar child directories, indicating that hosts A and B both provide print and database services. Under each host-specific and service-specific directory (e.g. /.:/HOSTS/HOST_A/SERVICES/PRINT) are specific server entries (e.g. SERVER_1) and a server group entry, i.e. an entry containing a list of the specific server entries (e.g. /.:/HOSTS/HOST_A/SERVICES/PRINT/SERVER_1).

A basic rule of the invention is that server applications have to export their binding information to locations defined by entries under the appropriate child directory of the /SERVICES directory associated with the appropriate host. In this example, these entries will be listed in the /SERVERS group entry under the /PRINT directory or under the/ DATABASE directory.

Also in accordance with the invention, the namespace is also defined, as shown in FIG. 2B, to include an applications directory, named /.:/APPLICATIONS, a child directory under this named /.:/APPLICATIONS/SERVICES, and a child directory under this latter directory for each of the services provided by server applications executing in the network. For example, these child directories may include /.:/APPLICATIONS/SERVICES/PRINT, for the print service, and /.:/APPLICATIONS/SERVICES/DATABASE, for the database service.

As further shown in FIG. 2B, each of these child directories contains entries pertaining to the various servers and resources. Specifically the entries include a servers group entry and a resources group entry. For the . . . /PRINT directory the servers group entry lists the entries:
/.:/HOSTS/HOST_A/SERVICES/PRINT/SERVERS and
/.:/HOSTS/HOST_B/SERVICES/PRINT/SERVERS.
These entries provide a link from the services branch of the hierarchy, shown in FIG. 2B, to the hosts branch of the hierarchy shown in FIG. 2A, and allow a client application to access binding information stored by server applications. The resources group entry contains:
/.:/APPLICATIONS/RESOURCES/PRINTERS/
    PRINTER_1,
/.:/APPLICATIONS/RESOURCES/PRINTERS/
    PRINTER_2 and
/.:/APPLICATIONS/RESOURCES/PRINTERS/
    PRINTER_3.
These entries provide a link to the resources branch of the hierarchy, shown in FIG. 2C and discussed further below.
Similarly, for the . . . /DATABASE directory the services group entry lists the entries:
/.:/HOSTS/HOST_A/SERVICES/DATABASE/SERVERS
    and
/.:/HOSTS/HOST_B/SERVICES/DATABASE/SERVERS,
and the resources group entry contains:
/.:/APPLICATIONS/RESOURCES/DATABASES/DATABASE_1 and
/.:/APPLICATIONS/RESOURCES/DATABASES/DATABASE_2.

The resources group entries listed in the above example refer to a directory named /.:/APPLICATIONS/RESOURCES, which is illustrated in FIG. 2C. Under this directory are child directories pertaining to the particular services, i.e. there are directories named /.:/APPLICATIONS/RESOURCES/PRINTERS and /.:/APPLICATIONS/RESOURCES/DATABASES. In each of these service-specific directories are group resource entries for each resource. For example, under the . . . PRINTERS directory there are a PRINTER_1 entry, a PRINTER_2 entry and a PRINTER_3 entry. Each of these resource entries lists the locations under the /HOSTS directory where the servers for these resources can be found. For example, for PRINTER_1 the only entry is /.:/HOSTS/HOST_A/SERVICES/PRINT/SERVER_1.

A similar resource directory structure is provided for the database service, with resource entries for DATABASE_1 and DATABASE_2.

The names of the child directories under the /APPLICATIONS/SERVICES directory are the common names of the services, which are the only names known and used by users in requesting services. In this example, there is a directory named /.:/APPLICATIONS/SERVICES/PRINT and a directory named /.:/APPLICATIONS/SERVICES/DATABASE. Each of these directories contains a group entry, which is an entry type permitted by CDS. A group entry is a list of names of other entries. In this case, a group entry in the directory /.: . . . /PRINT is a list of the entries in the /HOSTS directory pertaining to all of the print servers, i.e.:
/.:/HOSTS/HOST_A/SERVICES/PRINT/SERVERS and
/.:/HOSTS/HOST_B/SERVICES/PRINT/SERVERS.
Similarly, the group entry in the directory /.:/APPLICATIONS/SERVICES/DATABASE is a list of the entries in the /HOSTS directory pertaining to all of the database servers, i.e.:
/.:/HOSTS/HOST_A/SERVICES/DATABASE/SERVERS
    and
/.:/HOSTS/HOST_B/SERVICES/DATABASE/SERVERS.

When a new server application, such as a print server, exports its binding information to the shared repository of the directory service, the group entry in each of the /.:/ HOSTS/ . . . /SERVICES/PRINT directories has to be updated to include the full name of the entry in which the binding information is stored.

With this structure in place, accessing a server application from a client application, on behalf of a riser, becomes a simple and routine matter. If the user wants to access a prim server, and has no concern about which particular printer resource is used for the job, the user need only specify the common name PRINT. The client host reconstructs the full directory name /.:/APPLICATIONS/SERVICES/PRINT and accesses the group entry stored in this directory. It finds two entries, in this example:
/.:/HOSTS/HOST_A/SERVICES/PRINT/SERVERS and
/.:/HOSTS/HOST_B/SERVICES/PRINT/SERVERS.
At this point, the client application may be designed to present these two choices to the user, or simply to select one automatically, since both are capable of performing the print function. This is the replicated servers case, but obviously there may be instances in which only one server entry name is contained in a group under the /.:/APPLICATIONS/SERVICES directory.

Once an appropriate server entry name has been selected, the client application can access the server entry and import the binding data that will be used to establish a connection between the client application and the server application.

A similar procedure may be followed for accessing other types of service, such as the database service. The user simply specifies the common name DATABASE and client application ,generates the full name, which for databases is /.:/APPLICATIONS/SERVICES/DATABASE, locates a list of the database servers, and selects one from which binding data can be imported.

Of course, a user may wish to access a specific resource managed by a server application, such as a specific printer type. To handle this situation, the /.:/APPLICATIONS/SERVICES/PRINT directory also contains a RESOURCES group entry listing the printer resources by common name, such as PRINTER_1 and so forth. The full entry in each item in this group is of the form /.:/APPLICATIONS/RESOURCES/PRINTERS/PRINTER_1. This entry provides a link to the RESOURCES directory shown in FIG.

2C. Each entry in the /APPLICATIONS/RESOURCES/ PRINTERS directory provides, in turn, a link to the appropriate server entries in the /HOSTS directory.

Figure 3:
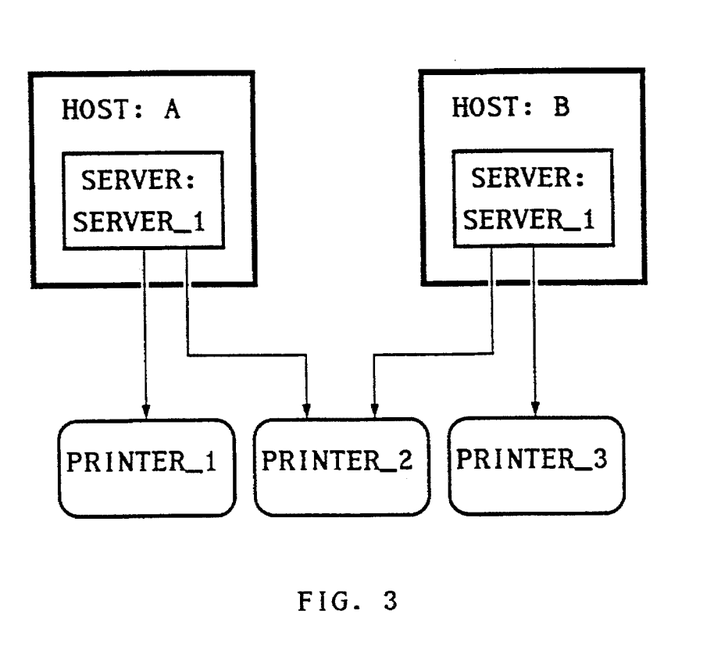
FIG. 3 is a block diagram showing the logical relationship between a print service managed by two servers and three print resources comprising three different printer types.

Suppose, for example, that there are three specific printer types, named PRINTER_1, PRINTER_2 and PRINTER_3. Suppose further that the three printer types may be associated with the servers in HOST_A and HOST_B in the manner shown diagrammatically in FIG. 3. Specifically, PRINTER_1 service is obtainable only through the print server in HOST_A, PRINTER_2 service is also obtainable only through the print server in HOST_B, and PRINTER_3 service is obtainable through either print server, in HOST_A or HOST_B. For this example, the group entries contained in the /.:/APPLICATIONS/RESOURCES/PRINTERS directory are:

| | |
|---|---|
| PRINTER_1 group entry: | ./:/HOSTS.HOST_A/SERVICES/PRINT/SERVER_1 |
| PRINTER_2 group entry: | ./:/HOSTS.HOST_B/SERVICES/PRINT/SERVER_1 |
| PRINTER_3 group entry: | ./:/HOSTS.HOST_A/SERVICES/PRINT/SERVER_1 |
| | ./:/HOSTS.HOST_B/SERVICES/PRINT/SERVER_1. |

In making a request for a particular resource (in this case a particular printer type), the user specifies the printer by its common name, PRINTER_3 in the example. The client host generates the name /.:/APPLICATIONS/RESOURCES/ and locates the PRINTER_3 group entry in this directory. This group entry lists the names of servers that provide service to the requested resource. In this example, the list includes:
/.:/HOSTS/HOST_A/SERVICES/PRINT/SERVER_1 and
/.:/HOSTS/HOST_B/SERVICES/PRINT/SERVER_1.
The list can be displayed to the user for a final selection, or the selection may be made automatically, since either instance of the server can provide the print function. Once a selection has been made, the client application uses a full name to import the selected server's binding information and a connection is established, for the user, between the client application and the selected resource.

The sequence of operations performed in accordance with the invention may be summarized as follows:

1. A server application designated SERVER_N, residing in HOST-X and associated with a distributed print function exports binding data to a location having the name /.:/HOSTS/HOST_X/SERVICES/PRINT/SERVER_N.

2. Whenever a new server application is added to the network, entries under the /.:/APPLICATIONS/SERVICES directory must be updated as follows (using the PRINT example):

a. The complete name of the location to which the binding data will be exported, i.e. /.:/HOSTS/HOST_X/SERVICES/PRINT/SERVER_N, is inserted in a group entry having the name /.:/APPLICATIONS/SERVICES/PRINT/SERVERS.

b. The APPLICATIONS/RESOURCES/PRINTERS directory is modified to make a correct association between the new server application and each of the printers that can be accessed through the new server application. The directory has a group entry for each printer, and the group entry for each printer that SERVER_N can access must contain the full name of the location to which SERVER_N binding information has been exported.

3. When a user, through a client application, wishes to access the print service, the user specifies only the common name of the service, i.e. PRINT.

4. Using the common name PRINT, the client application locates the directory /.:/APPLICATIONS/SERVICES/PRINT, and accesses a group entry in that directory, to obtain a list of names of locations where server binding data is stored.

5. A print server is selected, either automatically or with the cooperation of the user, and the complete name of the location where the binding data is stored is obtained from the /.:/APPLICATIONS/SERVICES/PRINT directory.

6. The client application imports the binding data and establishes a logical link with the server application and one of its resources.

An alternative sequence of operations 3–6 takes place when the user specifies a particular resource instead of a service for performing a particular function. For example, if the user specifies a particular printer PRINTER_3, the sequence of operations is:

3'. When a user, through a client application, wishes to access a particular print resource, the user specifies only the common name of the resource, e.g. PRINTER_3.

4'. Using the common resource name PRINTER_3, the client application locates the directory /.:/APPLICATIONS/RESOURCES/PRINTERS, and accesses a group entry in that directory, the group entry having a name that is the common name of the requested resource. The group entry provides a list of names of locations where print server binding data for the requested resource are stored.

5'. A selection is made, if necessary, of a host location for the print server application, either automatically or with the cooperation of the user, and the complete name of the location where the binding data is stored is obtained from the /.:/APPLICATIONS/RESOURCES/PRINTERS directory.

6'. The client application imports the binding data and establishes a logical link, through a server application, with the selected resource.

Use of UUIDs in the invention:

Computers in a network can distinguish different services, servers and resources by means of universally unique identifiers (UUIDs), which are defined and provided by DCE (Distributed Computing Environment). In a presently preferred embodiment of the invention, a UUID is used to represent each service, server instance and resource. The UUIDs are stored in their corresponding namespace entries. For example, a server ID is stored in each server entry in the namespace, a resource ID is stored in each resource entry, and a service ID is stored in each service group entry.

Figure 4:
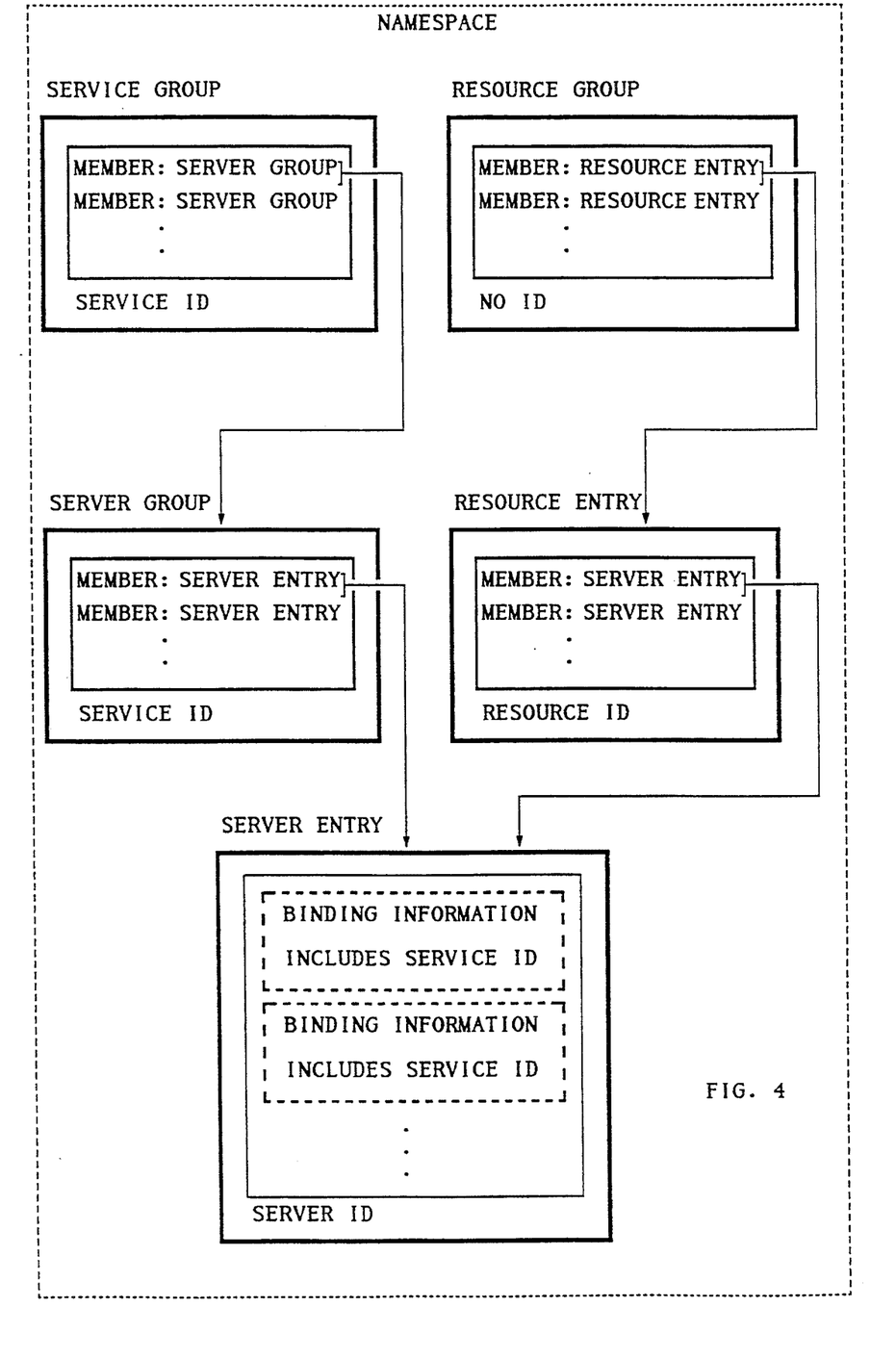
FIG. 4 is a block diagram of a namespace in generalized form, including each entry type (server, server group, service group, resource and resource group) and the indicating the data stored in each.

FIG. 4 shows in general how these UUIDs are stored in the namespace, in relation to a service group, server groups, a resource group, resource entries and server entries. Basically, FIG. 4 is a more generalized form of the namespace structure shown in FIGS. 2A–2C. A service group, such as for the print service, contains as its members one or more server groups. (It will be recalled that a server, or server application, is an implementation of a service on a specific host.) As indicated in FIG. 4, each service group has stored with it a service ID (a UUID that uniquely identifies the service, e.g. the print service). Each server group, which pertains to a specific host, also contains the service ID. Each entry in the server group is a server entry, which contains binding information including the service ID, and the server ID.

The server ID is stored in each server entry as its "object attribute," but the terminology is not critical for purposes of the present explanation. When a client obtains binding information from a server entry, the service ID and server ID can be used obtain a specific server location on the selected host. For example, there may be two or more server instances in the same host, at different locations or addresses. To distinguish the servers, each must be registered in the host in a lookup table referred to as an endpoint map. The map is accessed by service ID and server ID and provides dynamic endpoints (effective locations) and other information about each server, uniquely identified by server ID and service ID. Therefore, if the server location obtained from the binding information is incomplete, the host's endpoint map is used to resolve the ambiguity and to ensure that clients bind to the servers they requested. For example, if two servers of a service run on a single host and they export to server entries X and Y, a client that imports a binding from entry X will receive the endpoint for the server that exported to entry X, as distinguished from entry Y.

As also shown in FIG. 4, the namespace includes a resource group (with no ID), each member of which is a resource entry containing a unique resource ID (a UUID). Each resource entry contains as members one or more server entries, each with an associated server ID stored with the entry. The resource group (for a particular service, such as printing) has as many members (resource entries) as there are resources available to perform the service. Each member resource entry has a member (a server entry) for each host-server combination from which the resource is available. The generality of FIG. 4 is clarified by the more specific example of FIG. 5, which depicts a service group for print services, two server groups, for hosts A and B, respectively, and two corresponding server entries. Also shown by way of example are a resource group containing three printer resource entries, each of which has one or more corresponding server entries.

Figure 5:
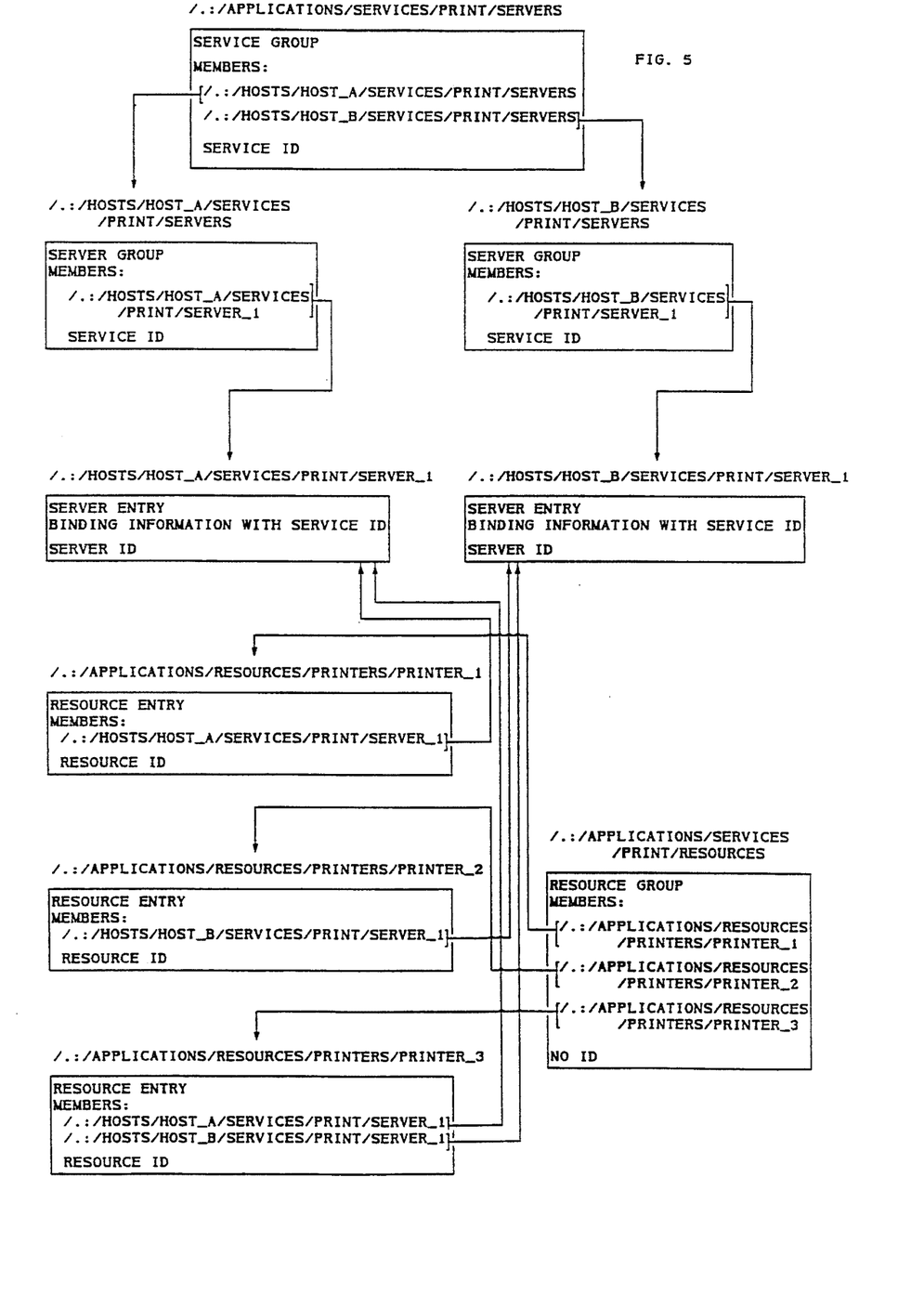
FIG. 5 is a block diagram of a namespace including entries for a print service, print servers and print resources, and showing the relationships between these entries, as well as the universally unique identifiers (UUIDs) stored with each entry.

FIG. 5 corresponds to FIG. 3 and portions of FIGS. 2A–2C relating to the print service and printer resources, but also shows how UUIDs are stored in the namespace. The service group /.:/APPLICATIONS/SERVICES/PRINT/ SERVERS depicted in FIG. 5 has two (server group) entries in the HOSTS region of the namespace; specifically, /.:/HOSTS/HOST_A/SERVICES/PRINT/SERVERS and /.:/HOSTS/HOST B/SERVICES/PRINT/SERVERS. Each server group has a member for each server that provides the service on the particular host. In the example, the server group associated with host A has one (server entry) member, associated with SERVER_1, and similarly the server group associated with host B has one (server entry) member associated with SERVER_1. Also stored in each server group is the service ID, in this case a unique identifier that defines the printing service. The server entries contain binding information relating to the location of a server, together with the service ID and the server ID. The server and service IDs have two broad purposes in the scheme of the invention. First, as discussed above, the IDs afford access to more complete information pertaining to the locations of servers in host systems. Each host has an endpoint map that provides server location information and is accessed by server ID and service ID. A secondary purpose is to provide a validity check for the namespace entries. For example, a server group, which has the service ID as its object attribute, should contain only members which have the same service ID in their binding information.

FIG. 5 also shows a resource group for print resources, designated by /.:/APPLICATIONS/SERVICES/PRINT/RE- SOURCES. The group has three members (resource entries), in this example, corresponding to printer_1, printer_2 and printer_3. Each resource entry has one or more members (server entries), each corresponding to a particular host-server combination. The server entry that is a member of printer_1 resource entry is /.:/HOSTS/HOST_A/SER- VICES/PRINT/SERVER_1, indicating that there is just one server for printer_1, and it is available on host_a. Similarly, the server entry that is a member of printer_2 resource entry is designated as /.:/HOSTS/HOST_B/SERVICES/PRINT/ SERVER_1, indicating that there is also only one server for printer_2, on host_b. Finally, the server entry members of the resource entry corresponding to printer_3 are given by: /.:/HOSTS/HOST_A/SERVICES/PRINT/SERVER_1 and /.:/HOSTS/HOST_B/SERVICES/PRINT/SERVER_1, indicating that there are two servers available for printer_3. A resource ID is stored with each resource entry. The resource ID is not used in the endpoint map but is used by the client to notify the server which resource to operate on.

These simple examples are not intended to limit the scope of the invention. For example, the designations PRINTER_ 1, PRINTER_2 and so forth, would normally be replaced by more descriptive names in a real network. Further, in a modern network environment there would typically be a much larger number of servers and resources than is illustrated in these examples. Without the invention it would be extremely difficult to register a large number of servers and resources in a logical manner that avoids name conflicts, and to communicate the locations of stored binding information to a large number of client applications that may wish to access the provided services and resources.

It will be appreciated from the foregoing that the present invention represents a significant advance in the field of distributed computing. In particular, the invention provides a mechanism for organizing a namespace of a directory service in such a way that users can access specific services or resources without knowing any more than the common names for these services or resources. Although specific examples of the invention have been discussed in this description, it will be understood that various modifications may be made without departing from the spirit and scope of the invention. Accordingly, the invention should not be limited except as by the appended claims.

We claim:

1. For use in a distributed computing environment, a method for structuring a hierarchical namespace accessible from all host systems in the environment, the method comprising the steps of:

defining a host sub-hierarchy containing for each host, and each service provided by the host, a list of storage locations to be used by server applications for storing information pertaining to respective servers performing the service; and defining a service sub-hierarchy containing for each service available in the distributed computing environment a list of the same storage locations defined in the host sub-hierarchy, wherein a client application can access the service sub-hierarchy using a common name of a desired service, and can thereby obtain information from a server application without knowledge of more than the common name of the service.

2. A method as defined in claim 1, and further comprising the steps of:

defining a resource sub-hierarchy containing for each service available in the distributed computing environment a list of resources available through each service; and defining for each resource a list of the same storage locations defined in the host sub-hierarchy, wherein a client application can access the resource sub-hierarchy using a common name of a desired resource, and can thereby obtain information from a server application without knowledge of more than the common name of the resource.

3. For use in a distributed computing environment, a hierarchical namespace accessible from multiple host systems in the environment, comprising:

a host sub-hierarchy containing for each host, and each service provided by the host, a list of storage locations to be used by server applications for storing information pertaining to respective servers performing the service; and a service sub-hierarchy containing for each service available in the distributed computing environment a list of the same storage locations defined in the host sub-hierarchy, wherein a client application can access the service sub-hierarchy using a common name of a desired service, and can thereby obtain information from a server application without knowledge of more than the common name of the service.

4. A hierarchical namespace as defined in claim 3, and further comprising:

a resource sub-hierarchy containing for each service available in the distributed computing environment a list of available resources for performing each service;

wherein the resource sub-hierarchy contains for each resource a list of the same storage locations defined in the host sub-hierarchy, and wherein a client application can access the resource sub-hierarchy using a common name of a desired resource, and can thereby obtain information from a server application without knowledge of more than the common name of the resource.

5. For use in a distributed computing environment, a method for transferring information between a server entity and a client entity in such a manner as to avoid conflicts and to permit the client entity to request a service without knowledge of any more than a common name for the service, the method comprising the steps of:

exporting information from a server to a server entry in a shared repository, the server entry being accessed by a name that completely identifies the server by host name and server name;

storing in a service entry of the shared repository the full name of the server entry used in the exporting step, wherein the service entry is accessed by a name that includes a common name for the service provided by the server, and wherein the service entry includes the full name of the server entry; and importing the exported information into a client entity, using only the common name of the service, wherein the importing step includes retrieving the service entry to obtain the full name of the server entry, then retrieving the server entry before importing the information.

6. A method as defined in claim 5, wherein:

the importing step also includes generating the full name of the service entry from the common name of the service, prior to retrieving the service entry to obtain the full name of the server entry.

7. For use in a distributed computing environment, a method for transferring information between a server entity and a client entity in such a manner as to avoid conflicts and to permit the client entity to request a particular resource without knowledge of any more than a common name for the resource, the method comprising the steps of:

exporting information from a server to a server entry in a shared repository, the server entry being accessed by a name that completely identifies the server by host name and server name;

storing in at least one resource entry of the shared repository the full name of the server entry used in the exporting step, wherein each resource entry is accessed by a name that includes a common name for the resource accessed by the server, and wherein each resource entry, includes the full names of all server entities through which the resource can be accessed; and importing the exported information into a client entity, using only the common name of the resource, wherein the importing step includes retrieving the resource entry to obtain the full names of all server entries associated with the resource, then selecting one of the server entries and retrieving the server entry before importing the information.

8. A method as defined in claim 7, wherein:

the importing step also includes generating the full name of the resource entry from the common name of the resource, prior to retrieving the resource entry to obtain the full names of the: server entries.

9. A method utilizing a shared hierarchical storage structure to facilitate passing of information from a server entity to a client entity in a distributed computing environment, comprising the steps of:

defining the shared storage structure to include a server entry sub-hierarchy of the namespace accessible by host name and server name, a service entry sub-hierarchy of the namespace accessible by service common name, and a resource entry sub-hierarchy of the namespace accessible by service common name and resource common name;

for each server entity, storing binding information in the server entry sub-hierarchy of the namespace, to define how to access the server entity;

for each service, storing in the service entry sub-hierarchy of the namespace a full name for each server providing the service;

for each resource, storing in the resource entry sub-hierarchy of the namespace a full name for each server providing access to the resource;

requesting, in a client entity, access to a desired service or resource, using only a common name;

retrieving an appropriate server entry name from the service entry sub-hierarchy of the namespace, if access to a service has been requested;

retrieving an appropriate server entry name from the resource entry sub-hierarchy of the namespace, if access to a particular resource has been requested; and using the retrieved server entry name to retrieve binding information from the server entry sub-hierarchy of the namespace.

10. A method as defined in claim 9, wherein each of the steps of retrieving an appropriate server entry name includes:

generating a full name from the common name supplied in the requesting step;

using the full name to retrieve at least one server entry name to fulfill the request; and selecting frown the retrieved server entry names one that will be used to satisfy the request.

11. Apparatus for use in a distributed computing environment, for transferring information between a server entity and a client entity in such a manner as to avoid conflicts and to permit the client entity to request a service without knowledge of any more than a common name for the service, the apparatus comprising:

a shared repository accessible from multiple host systems in a distributed computing environment;

means for exporting information from a server to a server entry in the shared repository, the server entry being accessed by a name that completely identifies the server by host name and server name;

means for storing in a service entry of the shared repository the full name of the server entry used in the means for exporting, wherein the service entry is accessed by a name that includes a common name for the service provided by the server, and wherein the service entry includes the full name of the server entry; and means for importing the exported information into a client entity, using only the common name of the service, wherein the means for importing includes means for retrieving the service entry to obtain the full name of the server entry, and means for retrieving the server entry before importing the information.

12. Apparatus as defined in claim 11, wherein:

the means for importing also includes means for generating the full name of the service entry from the common name of the service, prior to retrieving the service entry to obtain the full name of the server entry.

13. Apparatus for use in a distributed computing environment, for transferring information between a server entity and a client entity in such a manner as to avoid conflicts and to permit the client entity to request a particular resource without knowledge of any more than a common name for the resource, the apparatus comprising:

a shared repository accessible from multiple host systems in a distributed computing environment;

means for exporting information from a server to a server entry in a shared repository, the server entry being accessed by a name that completely identifies the server by host name and server name;

means for storing in at least one resource entry of the shared repository the full name of the server entry used in the exporting step, wherein each resource entry is accessed by a name that includes a common name for the resource accessed by the server, and wherein each resource entry includes the full names of all server entities through which the resource can be accessed; and means for importing the exported information into a client entity, using only the common name of the resource, wherein the means for importing includes means for retrieving the resource entry to obtain the full names of all server entries associated with the resource, and means for selecting one of the server entries and retrieving the server entry before importing the information.

14. Apparatus as defined in claim 13, wherein:

the means for importing also includes means for generating the full name of the resource entry from the common name of the resource, prior to retrieving the resource entry to obtain the full names of the server entries.

15. Apparatus utilizing a shared hierarchical storage structure to facilitate passing of information from a server entity to a client entity in a distributed computing environment, the apparatus comprising:

a shared storage structure, including means for defining the shared storage structure to include a server entry sub-hierarchy of the namespace accessible by host name and server name, a service entry sub-hierarchy of the namespace accessible by service common name, and a resource entry sub-hierarchy of the namespace accessible by service common name and resource common name;

means for storing binding information, for each server entity, in the server entry sub-hierarchy of the namespace, to define how to access each server entity;

means for storing in the service entry sub-hierarchy of the namespace, for each service, a full name for each server providing the service;

means for storing in the resource entry sub-hierarchy of the namespace, for each resource, a full name for each server providing access to the resource;

means for requesting, in a client entity, access to a desired service or resource, using only a common name;

means for retrieving an appropriate server entry name from the service entry sub-hierarchy of the namespace, if access to a service has been requested;

means for retrieving an appropriate server entry name from the resource entry sub-hierarchy of the namespace, if access to a particular resource has been requested; and means for using the retrieved server entry name to retrieve binding information from the server entry sub-hierarchy of the namespace.

16. Apparatus as defined in claim 15, wherein each of the means for retrieving an appropriate server entry name includes:

means for generating a full name from the common name supplied by the means for requesting;

means for using the full name to retrieve at least one server entry name to fulfill the request; and means for selecting from the retrieved server entry names one that will be used to satisfy the request.

* * * * *